US011810307B2

(12) United States Patent
Guzik et al.

(10) Patent No.: US 11,810,307 B2
(45) Date of Patent: Nov. 7, 2023

(54) FACILITATING OBJECT TRACKING FOR PORTABLE CAMERA IMAGES

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 162 days.

(21) Appl. No.: 17/344,409

(22) Filed: Jun. 10, 2021

(65) Prior Publication Data

US 2022/0398748 A1 Dec. 15, 2022

(51) Int. Cl.
G06T 7/246 (2017.01)
G06V 20/10 (2022.01)

(52) U.S. Cl.
CPC .............. *G06T 7/248* (2017.01); *G06V 20/10* (2022.01); *G06T 2207/10016* (2013.01)

(58) Field of Classification Search
None
See application file for complete search history.

(56) References Cited

U.S. PATENT DOCUMENTS

| 7,839,431 | B2 * | 11/2010 | Swarr | G06T 7/80 |
| | | | | 348/94 |
| 11,265,469 | B1 * | 3/2022 | Gangwal | H04N 23/6812 |
| 2005/0280707 | A1 * | 12/2005 | Sablak | H04N 23/6811 |
| | | | | 348/E5.046 |

\* cited by examiner

*Primary Examiner* — Vikkram Bali
(74) *Attorney, Agent, or Firm* — Han Santos, PLLC

(57) ABSTRACT

Described herein are techniques that may be used to facilitate object tracking within a video captured using a portable recording device based on movements associated with that recording device. Such techniques may comprise receiving, from an image capture device, a current image data and an indication of an offset value, determining at least one object to be identified within the image data, determining a previous location of the at least one object within previous image data, and determining, based on the previous location and the offset value, a region within the image data to be attributed to the at least one object, the region comprising less than the current image. The techniques may further comprise determining a location of the at least one object within the region using at least one object recognition technique.

20 Claims, 5 Drawing Sheets

FACILITATING OBJECT TRACKING FOR PORTABLE CAMERA IMAGES

BACKGROUND

In recent years, a number of events have highlighted the need for increased record-keeping for law enforcement officers. This need pertains to evidentiary collection as well as protecting the public from potential abuses by a police officer and protecting the police officer from false accusations of abuse. Law enforcement has previously used various camera devices, such as patrol vehicle cameras and body mounted cameras, as a means of reducing liability and documenting evidence.

When a body camera is portable, such as a camera that is mounted on a person, the images collected by that portable camera are subject to that person's movements. This can make it difficult to perform certain image processing tasks. For example, when tracking an object depicted within a video, such tracking can be facilitated by predicting a likely location of the object within each frame of the video based on movement patterns for the object. However, such movement patterns of an object may be difficult to discern when the person wearing the body camera is also moving and the image collected by the camera is shifting.

SUMMARY

In some cases, it may be necessary to track on object depicted within a series of images throughout that series of images. Techniques are provided herein for facilitating object tracking within a video captured using a portable recording device based on movements associated with that recording device. In such techniques, sensor data may be obtained from various positional sensors installed on the image capture device. The sensor data may be used to determine an offset value indicative of a degree of movement for the image capture device while capturing images. When performing object tracking on an obtained image, a region may be determined within the image data that is likely to include the object based on a previous determined location of the object within obtained image data and the offset value.

In one embodiment, a method is disclosed as being performed by an image capture device, the method comprising receiving, from an image capture device, current image data and an indication of an offset value, determining at least one object to be identified within the current image data, determining a previous location of the at least one object within previous image data, determining, based on the previous location and the offset value, a region within the current image data to be attributed to the at least one object, and determining a location of the at least one object within the region using at least one object recognition technique.

An embodiment is directed to a computing device comprising: a processor; and a memory including instructions that, when executed with the processor, cause the computing device to receive, from an image capture device, a current image data and an indication of an offset value, determine at least one object to be identified within the current image data, determine a previous location of the at least one object within a previous image data, determine, based on the previous location and the offset value, a region within the current image data to be attributed to the at least one object, and determine a location of the at least one object within the region using at least one object recognition technique.

An embodiment is directed to a non-transitory computer-readable media collectively storing computer-executable instructions that upon execution cause one or more computing devices to perform acts comprising receiving, from an image capture device, a current image data and an indication of an offset value, determining at least one object to be identified within the current image data, determining a previous location of the at least one object within a previous image data, determining, based on the previous location and the offset value, a region within the current image data to be attributed to the at least one object, and determining a location of the at least one object within the region using at least one object recognition technique.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
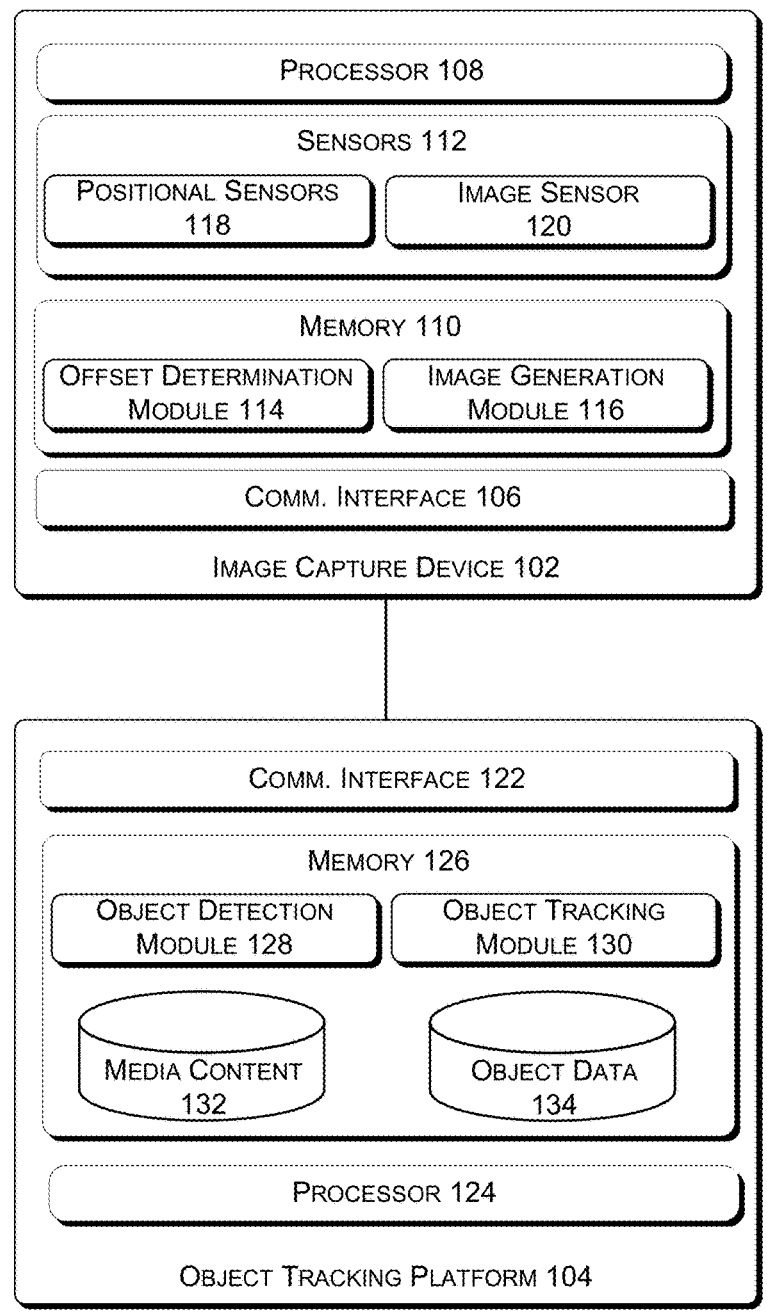
FIG. 1 is a block diagram showing various components of a system architecture 100 that supports object tracking while accounting for movement data in accordance with embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that may be used to facilitate tracking of an object within a series of images (e.g., video frames). In such techniques, sensor data is obtained with respect to the series of images that is indicative of one or more changes in a position of the image capture device that occurs during the collection of the series of images. The sensor data is used to generate one or more offset values.

In the techniques described herein, an offset value may be generated based on information received from any number of positional sensors during a period of time (e.g., a period of time that has elapsed between the capture of two images in the series of images). Such positional sensors may comprise accelerometers, gyroscopes, magnetometers, global positioning system (GPS) devices, or any other suitable sensor capable of obtaining information about one or more changes in a position of the image capture device.

When performing object tracking within the series of images, the offset values may be used along with a previous position of an object and a velocity of that object to predict a region in which the object is likely to be found within a subsequent image (e.g., the next frame of a video). Such a region may comprise a portion of the image that is less than the image in its entirety.

The proposed system may include a body camera capable of obtaining positional sensor data in communication with an object tracking platform. Embodiments of the disclosure provide for several advantages over conventional systems. For example, embodiments of the proposed system enable more efficient object tracking within video than would otherwise be available using conventional techniques. In a conventional portable camera system, object tracking for video taken from a portable device can require significant processing power. This is due to the fact that movements (and especially erratic movements) of an operator of the portable device may make predicting an object's location within the video nearly impossible. Accordingly, in such a system, object detection may need to be performed on each frame in its entirety in order to locate an object in each frame during object tracking.

Embodiments of the disclosure may be effective in reducing processing power needed to perform object tracking. Particularly, embodiments of the disclosed system may provide significant advantages when used in conjunction with videos captured using portable (or otherwise unstable) image capture devices such as a portable camera or camcorder. By accounting for movements of the portable device as captured via positional sensors, an object's approximate position within an image can be predicted, significantly reducing the portion of the image on which object recognition must be performed during object tracking.

FIG. 1 is a block diagram showing various components of a system architecture 100 that supports object tracking while accounting for movement data in accordance with embodiments. The system architecture 100 may include an image capture device and an object tracking platform 104. The image capture device 102 may include a communication interface 106, one or more processors, such as processor 108, a memory 110, and a number of sensors 112. In some embodiments, the image capture device may further include a user interface that enables interaction between a user and the image capture device. For example, the user interfaces may include a data output device (e.g., visual display, audio speakers), and one or more data input devices. The data input devices may include, but are not limited to, combinations of one or more of keypads, keyboards, mouse devices, touch screens that accept gesture inputs, audio input (e.g., voice or speech input), and any other suitable user input type.

The image capture device 102 can include any suitable electronic device or combination of electronic devices configured to perform at least a portion of the operations described herein. In some embodiments, the image capture device may comprise a digital camera capable of capturing images (e.g., still images and/or video). An image capture device may be configured to be mounted on a moving object, such as a person or a vehicle.

The communication interface 106 may include wireless and/or wired communication components that enable the image capture device to transmit or receive data via a network, such as the Internet, to a number of other electronic devices (e.g., object tracking platform 104). Such a communication interface 106 may include access to both wired and wireless communication mechanisms. In some cases, the image capture device transmits data to other electronic devices over a long-range communication channel, such as a data communication channel that uses a mobile communications standard (e.g., long-term evolution (LTE)).

The memory 110 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors, such as processor 108 and the memory 110 of the image capture device 102 may implement functionality from one or more software modules and data stores. Such software modules may include routines, program instructions, objects, and/or data structures that are executed by the processors to perform particular tasks or implement particular data types. The memory 110 may include at least a module for determining a positional offset for the image capture device (e.g., offset determination module 114), a module for generating an image from captured raw image data (e.g., image generation module 116).

The sensors 112 may include any sensor devices capable of obtaining information about the image capture device. In some embodiments, such sensors may include both positional sensors 118 capable of collecting information about a position of the image capture device as well as at least one image sensor 120 capable of collecting raw image data. The image sensor may be digital image sensor within a digital camera.

In some nonlimiting examples, the positional sensors 118 may include a temperature sensor, a real-time clock (RTC), an inertial measurement unit (IMU), or any other suitable sensor. An IMU may be any electronic device that measures and reports a body's (e.g., the image capture device) specific force, angular rate, and sometimes the orientation of the body, using a combination of accelerometers, gyroscopes, and magnetometers.

An image sensor 120 may comprise a number of photosites, each of which collect information about light that strikes the respective photosite. The photosites may be arranged in an array comprised of rows and columns. Raw image data can be generated by compiling information collected from each of the photosites, such that information from each photosite may correspond to a pixel in the raw image data based on the respective position of the photosite within the array of photosites. A standardized image can then be generated from the raw image data collected from the various photosites.

The offset determination module 114 may be configured to, in conjunction with the processor 108, determine an offset for the image capture device. Such an offset may be determined based on sensor data received from the one or more positional sensors with respect to a period of time. For example, an offset may be determined based on an amount of movement that has occurred within a predetermined period of time from a prior determined position. In some embodiments, the amount of movement may be determined based on an amount of acceleration and/or a degree of angular rotation of the image capture device. Information about the amount of movement may be determined based on data received from one or more positional sensors of the image capture device. For example, data received from an accelerometer and/or gyroscope may be used to determine an amount of movement for the image capture device as well as a direction of such movement.

In some embodiments, an offset may be expressed as a degree or angle. In some embodiments, an offset may be translated into a number of pixels and a direction within a captured image. For example, the offset determination module may determine that there is a 3° offset to the right based on a movement of the image capture device of 3° to the left. In this example, the offset determination module may translate the 3° offset to an offset of +5 pixels. In this example, the direction may be represented via a plus or minus. By way of illustration, a plus when used in a horizontal component may indicate a movement in the left direction whereas a minus when used in the horizontal component may indicate a movement in the right direction. Alternatively, a plus when used in a vertical component may indicate a movement in the upward direction whereas a minus when used in the vertical component may indicate a movement in the downward direction.

The image generation module 116 may be configured to, in conjunction with the processor 108, generate an image from raw image data obtained from an image sensor. In some embodiments, the image generation module may be configured to select an array of pixels from raw image data to be included within a generated (e.g., standardized) image. In some cases, this may comprise selecting an array of pixels of a particular size to be included within the image (e.g., a number of pixels along an X-axis by a number of pixels along a Y-axis) based on a desired resolution and aspect ratio (e.g., 1024×720, etc.).

Once a standardized image has been generated by the image capture device, that standardized image may be provided to an object tracking platform 104. Such an object tracking platform 104 may comprise any suitable electronic device capable of receiving the standardized image (e.g., via the communication interface 106). The standardized image may be transmitted to the object tracking platform 104 via a wired or wireless connection. In some embodiments, the standardized image may be transmitted to the object tracking platform in substantial real-time (e.g., as the image is captured). For example, the standardized image may comprise streaming video imagery that is provided in real-time to a remote server (e.g., the object tracking platform).

As noted above, the image capture device may be in communication with an object tracking platform. The image capture device may transmit an image generated by the image generation module to the object tracking platform along with an indication of an offset as determined by the offset determination module. The object tracking platform 104 can include any suitable computing device or combination of computing devices configured to perform at least a portion of the operations described herein. The object tracking platform 104 may include a communication interface 122, one or more processors 124, and a memory 126.

The one or more processors 124 and the memory 126 of the object tracking platform 104 may implement functionality from one or more software modules and data stores. Such software modules may include routines, program instructions, objects, and/or data structures that are executed by the processors 124 to perform particular tasks or implement particular data types. The memory 126 may include at least a module for detecting an object within image data (e.g., object detection module 128) and a module for tracking an identified object within the image data based on provided offset data (object tracking module 130). Additionally, the memory 126 may further include one or more databases, such as a database of media content received from at least one image capture device (e.g., media content 132) and a database of information about one or more objects identified within image data (e.g., object data 134).

The object detection module 128 may be configured to, in conjunction with the processor 124, use one or more object recognition techniques to identify one or more objects depicted within received image data. The one or more object recognition techniques may include such techniques as edge detection, spatial pyramid pooling, Region-Based Convolutional Network (e.g., R-CNN), Histogram of oriented gradients (HOG), Region-based Fully Convolutional Networks (R-FCN), Single Shot Detector (SSD), Spatial Pyramid Pooling (SPP-net), or any other suitable technique for identifying, and determining a location of, an object. In some embodiments, this may comprise the use of one or more trained machine learning models that are specifically trained to identify one or more objects within image data. For example, such machine learning models may be trained by providing images of known objects (i.e., inputs) as well as feedback (i.e., outputs) in the form of object identifications. Suitable objects to be identified may include vehicles, persons, weapons, or any other suitable object type.

The object tracking module 130 may be configured to, in conjunction with the processor 124, identify a position of a detected object within a video. In some embodiments, this comprises identifying a position of the object within a video on a frame-by-frame basis. In some embodiments, information about a speed and/or direction of travel for the object within the video may be used to identify a region or area within a frame of the video within which the object is likely to be depicted. Such a region or area may be determined based on determined movement information for the object as well as offset information received from the image capture device. For example, the object tracking module may first determine a region within the frame that is likely to include the object to be tracked based on movements of the object. A location of such a region or area within the frame may then be adjusted based on the offset data received from the image capture device. Once such a region has been identified, the object detection module may be used to identify the object within the region. It should be noted that by limiting the performance of the object recognition techniques to an identified region of the frame, processing can be made more efficient.

The communication interface 122 may include wireless and/or wired communication components that enable the image capture device to transmit or receive data via a network, such as the Internet, to a number of other electronic devices (e.g., image capture device 102). Such a communication interface 122 may include access to both wired and wireless communication mechanisms. In some cases, the object tracking platform communicates with other electronic devices over a long-range communication channel, such as a data communication channel that uses a mobile communications standard (e.g., long-term evolution (LTE)).

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
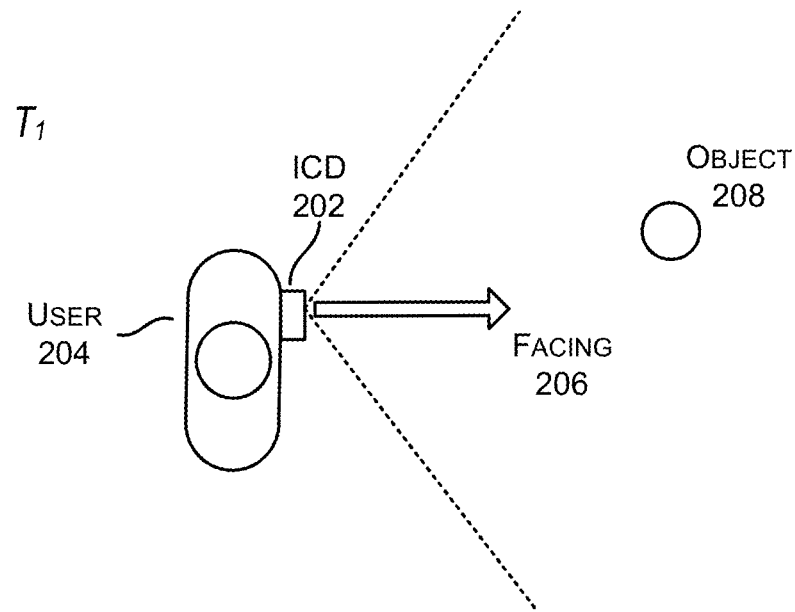
FIG. 2 depicts an illustrative example of an offset that may be determined for a body-mounted image capture device in accordance with some embodiments.
Figure 2:
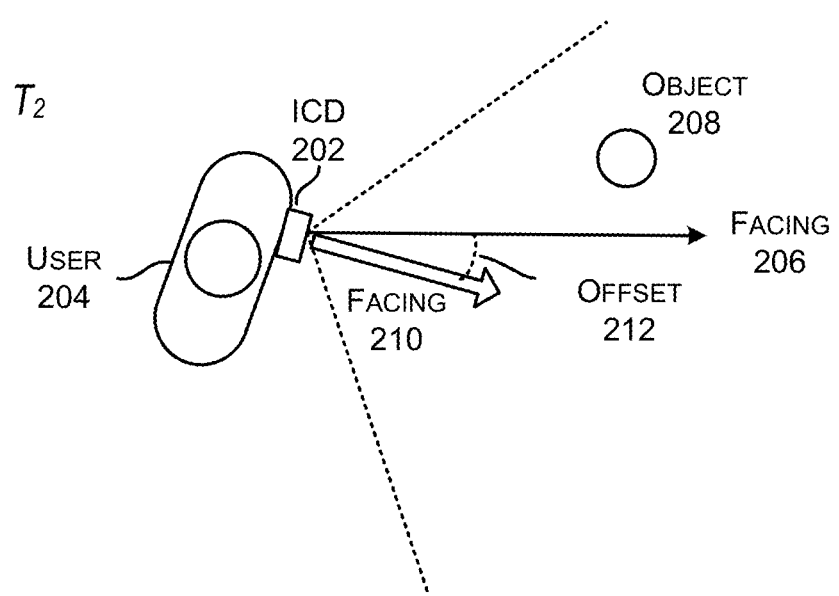

FIG. 2 depicts an illustrative example of an offset that may be determined for a body-mounted image capture device in accordance with some embodiments. Particularly, FIG. 2 depicts an overhead view of a user wearing a body-mounted camera. As depicted in FIG. 2, an image capture device (ICD) 202 may be mounted on a user 204. When mounted, the image capture device 202 includes an image sensor configured to capture images of an area in front of the image capture device at facing 206. Such images may include depictions of one or more objects, including object 208, located in front of the image capture device.

As noted elsewhere, the image capture device may include a number of positional sensors (e.g., positional sensors 118 as described with respect to FIG. 1) capable of obtaining and providing information on movements (e.g., changes in orientation and/or a position) associated with an image capture device. Such positional information may be used to determine an amount and a direction in which the image capture device is moved. For example, movement data may be determined based on one or more readings obtained from a gyroscope, an accelerometer sensor, or other position and/or movement sensor. In this example, the readings may indicate a direction of acceleration and/or rotation of the image capture device.

In some embodiments, readings from a magnetometer may be used to determine a facing 206 (e.g., orientation) of the image capture device based on a determined direction of the earth's magnetic field. In such embodiments, a comparison may be made between a facing 206 of the image capture device at a first point in time $T_1$ and a facing 210 of the image capture device at a second point in time $T_2$.

An offset 212 may be identified between the facing 206 and the facing 210 based on this comparison. In some embodiments, the offset may be determined as an angle that comprises a number of degrees difference between the facing 206 and the facing 210. Such an angle may be translated into a number of pixels within the captured image data or some other suitable indication of an amount by which an offset should be applied during object tracking.

In some embodiments, an offset value may be generated that includes components comprised of at least a horizontal offset and a vertical offset. For example, such an offset value may be generated in an X:Y format, where X represents a determined horizontal offset and Y represents a determined vertical offset. In some embodiments, an offset may include information about movements along a Z axis. For example, such information may indicate an amount of movement that a user travels forward or backward. In some embodiments, a size of a region identified with respect to an object in an image may be determined based on the information about the movements along the Z axis. For example, the size of the region may be increased upon detecting that the user has moved closer to the object. In contrast, the size of the region may be decreased upon detecting that the user had moved away from the object.

As noted elsewhere, an offset value may be generated based on a change in position and/or orientation as detected via the use of positional sensor data over a period of time. In other words, one or more changes in position can be determined from the sensor data collected over the period of time (e.g., between collection of images in a series of images). An offset value may then be calculated to counter such movements. For example, consider a scenario in which the offset value includes both horizontal (E.g., X-axis) and vertical (Y-axis) component values. In such a scenario, the offset value may be +5:−8, representing that a region to be used in object detection may be located five pixels to the left of, and eight pixels below, the object's previously-detected location.

As noted above, offset values may be determined with respect to a period of time. In some embodiments, such a period of time may correspond to timing for the collection of images. For example, the period of time may correspond to a period of time that has elapsed between the collection of a first image and a subsequent image in a series of images. By way of illustration, an offset value may be generated for each frame of a video based on changes in position/orientation detected between collection of that frame and the collection of a previous frame. In this way, each image (e.g., frame) within a series of images (e.g., a video) may be associated with a different offset value that may be applied to facilitate object detection techniques performed for all objects depicted within that frame.

Figure 3:
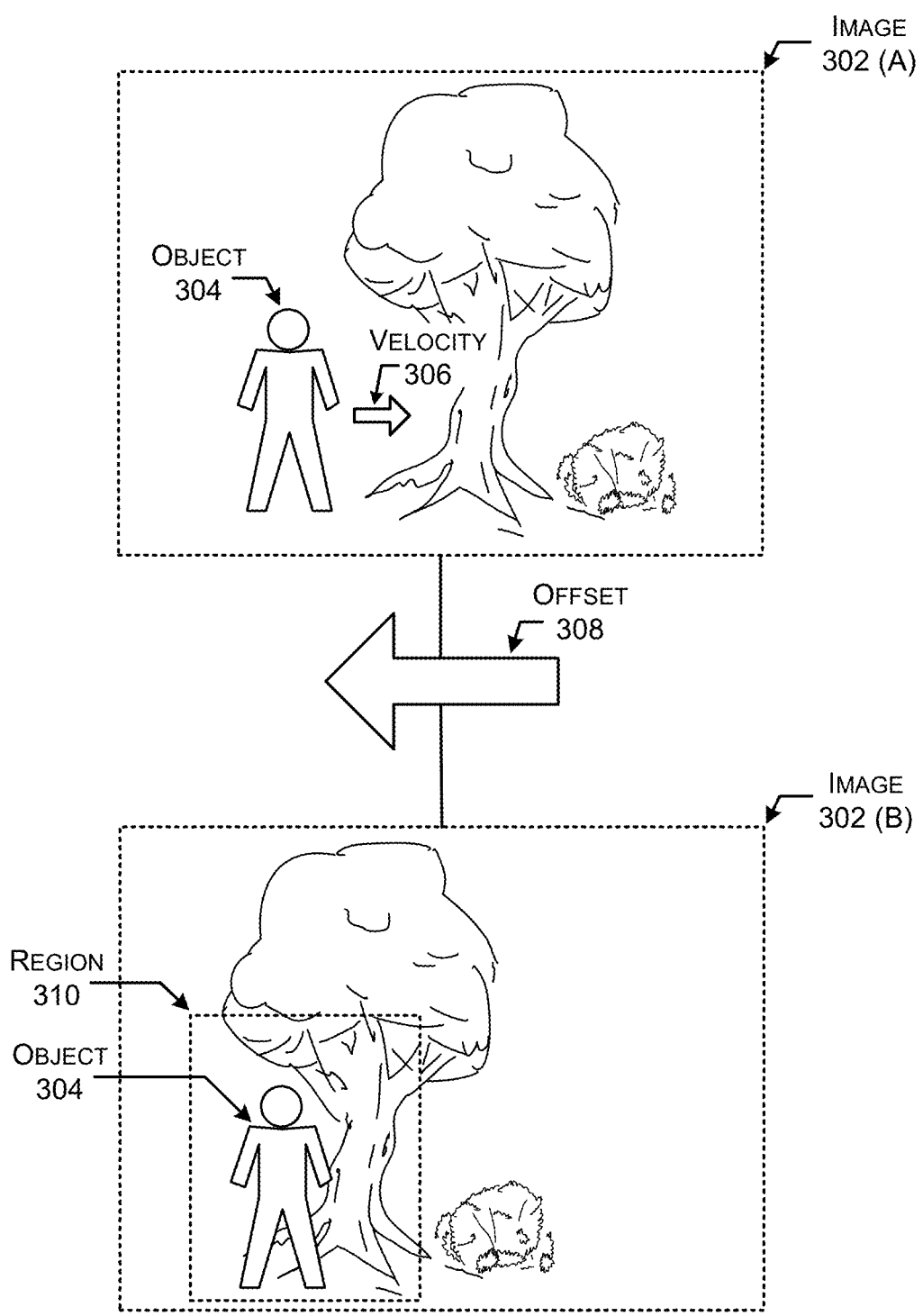
FIG. 3 depicts an illustrative example of movement of an object and a region within an image to be checked for the object in order to facilitate object tracking.

FIG. 3 depicts an illustrative example of movement of an object and a region within an image to be checked for the object in order to facilitate object tracking. As depicted in FIG. 3, a number of images (e.g., image 302 (A) and 302 (B)) may be captured by an image capture device. In some embodiments, the number of images may comprise separate frames of a video.

In some embodiments, at least some of the images in a series of images may include a depiction of an object 304. Each of the at least one depicted object may be associated with a velocity 306 that represents a speed and direction of travel for that object as determined within the number of images. In some embodiments, such a velocity may be determined based on that object's location as depicted within previously occurring images in the series of images (e.g., previous frames of a video). For example, an object's determined position in a first image may be compared to the object's determined position within a subsequent image. In this example, a distance and direction between the two locations may be determined with respect to an amount of time that elapsed between the collection of the two images.

As noted above, an offset 308 may be determined for each of the number of images in a series of images. Such an offset may be determined using the sensor data obtained from the image capture device as that device moves. That sensor data may comprise data received from an accelerometer, gyroscope, magnetometer, or some other positional sensor. The offset may be determined based on sensor data received in a period of time that has elapsed between the capture of the image 302 (A) and the capture of the image 302 (B).

As noted elsewhere, the process may comprise identifying a region 310 of the image 302 (B) within which the object 304 is likely to be detected. The region may comprise an area that is a portion of the image less than its entirety. In some embodiments, the size of such an area may be determined based on a size of the object to be detected, movement along a Z-axis (e.g., backward or forward) and/or the velocity of the object within the number of images. The position of the region within the image 302 (B) may be determined based on a position of the object within the image 302 (A), the velocity of the object, and the determined offset. Object tracking can then be performed to determine a position of the object within the region as opposed to within the image in its entirety. By limiting any object tracking to such a region rather than the image in its entirety, an amount of processing required to perform such object tracking can be reduced.

An image (e.g., 302 (A or B)) may be an array that includes rows and columns of pixels. In some cases, such rows and columns that make up the image may include thousands or even millions of pixels. It should be noted that the region 310 as identified within the image 302 (B) may be smaller than (e.g., comprise fewer pixels than) the image itself. By way of illustration, a region that is 360 pixels by 200 pixels may be selected from an image that is 1024 pixels by 768 pixels.

Figure 4:
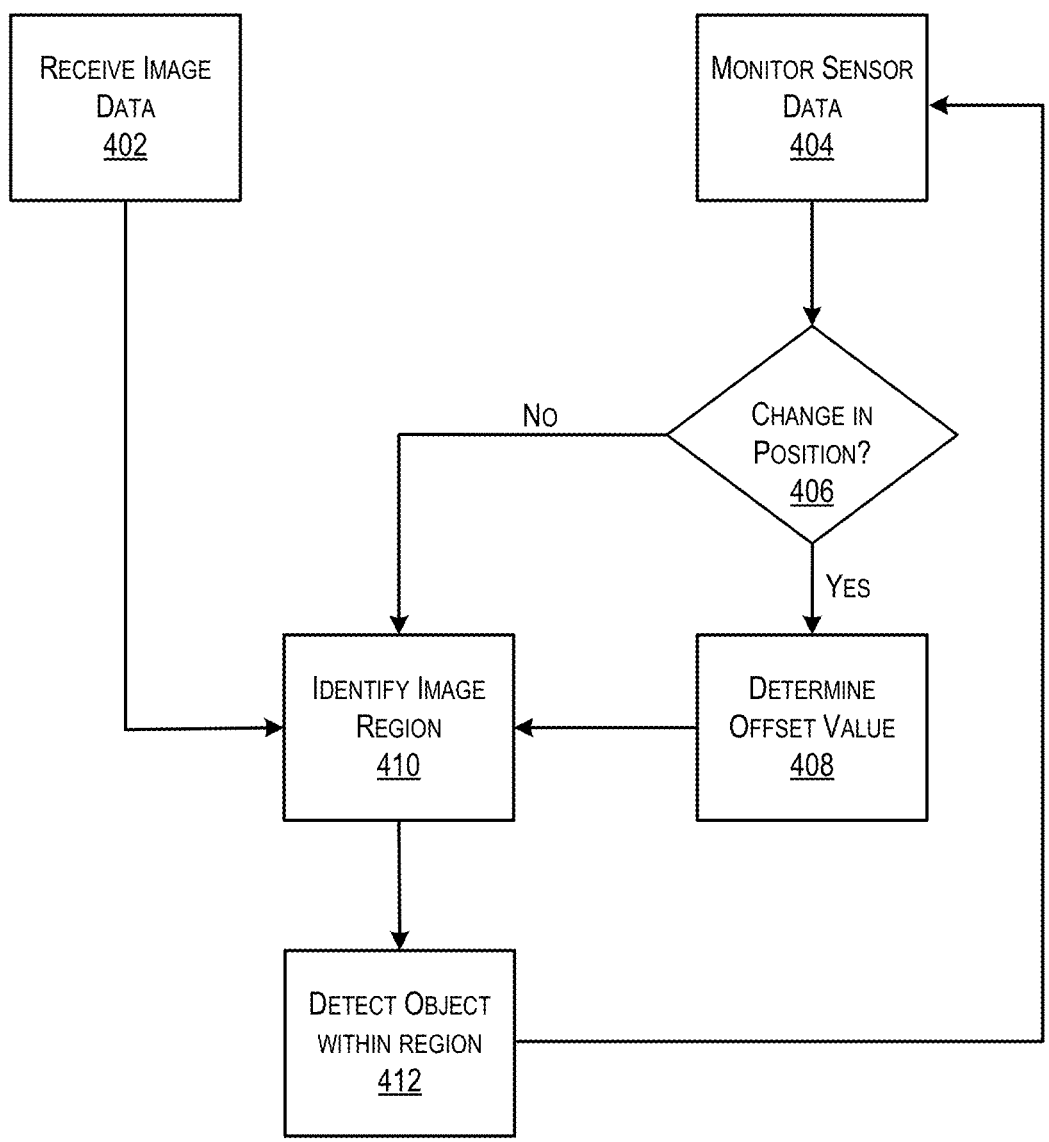
FIG. 4 depicts a block diagram showing an example process flow for facilitating object tracking in accordance with embodiments.

FIG. 4 depicts a block diagram showing an example process flow for facilitating object tracking in accordance with embodiments. The process 400 involves interactions between various components of the system architecture 100 as described with respect to FIG. 1 above. More particularly, the process 400 involves interactions between at least an image capture device 102 and/or object tracking platform 104. In some embodiments, the process 400 provides for determination of a region within an image to facilitate object tracking.

At 402 of the process 400, image data may be received from one or more image sensors of an image capture device. In some embodiments, the image data may comprise video data that is made up of a series of images (e.g., video frames). In some embodiments, the image data may comprise a two-dimensional representation of an environment situated in front of the image capture device. In some embodiments, the image data may be received in real-time (e.g., substantially as the image data is collected) as streaming video data.

At 404 of the process 400, sensor data may be obtained from one or more sensors installed on the image capture device. Suitable sensor data may include any sensor data capable of being used to detect a change in position of the image capture device that collected the image data.

At 406 of the process 400, a determination is made as to whether the sensor data is indicative of a change in facing of the image capture device. In some embodiments, the change in facing of the image capture device may be represented as a degree of rotation or a degree of movement along one or more axes. For example, a degree of rotation or a degree of movement along a horizontal and/or vertical axis. In some embodiments, a degree of movement along a Z-axis (e.g., forward or backward for a user wearing the device) may also be captured.

Upon making a determination that a position of the image capture device has been changed (e.g., "Yes" from decision block 406), process 400 may comprise determining an offset value to be associated with the image at 408. An offset value may include at least a data value and a direction. In some embodiments, an offset value may include a set of component values. For example, the offset value may include a horizontal value component, a vertical value component, and/or a backward/forward value component.

Once an offset value has been determined, or upon making a determination that there has been no change in position of the image capture device ("No" from decision block 406), the process 400 may comprise identifying a region of the image data that is predicted to include the depiction of the object at 410. Such a region may be identified based on a location of the object as detected within a previously processed image data. Additionally, the region may be determined based on a determined velocity of the object. For example, the object may be tracked across multiple images in a series of images and a velocity of the object may be determined based on a change in position of the object throughout the multiple images. In some embodiments, a size of such a region may be determined based on a size and/or velocity of the object as detected within a previously processed image data. In some cases, a size of the region may be determined based at least in part on information about movement along a z-axis (e.g., backward or forward movement of a user).

At 412, the process 400 comprises performing object recognition on the determined region. In some embodiments, the portion of the image corresponding to the determined region is provided as input to a trained machine learning model. Such a model may have been trained using a suite of images of the various object types that might be tracked. For example, the machine learning model may be trained using a suite of images that include data patterns associated with known object types. The object recognition techniques may be used to determine a location associated with the object. In some embodiments, the location of the object may be expressed as coordinates within the image data.

Figure 5:
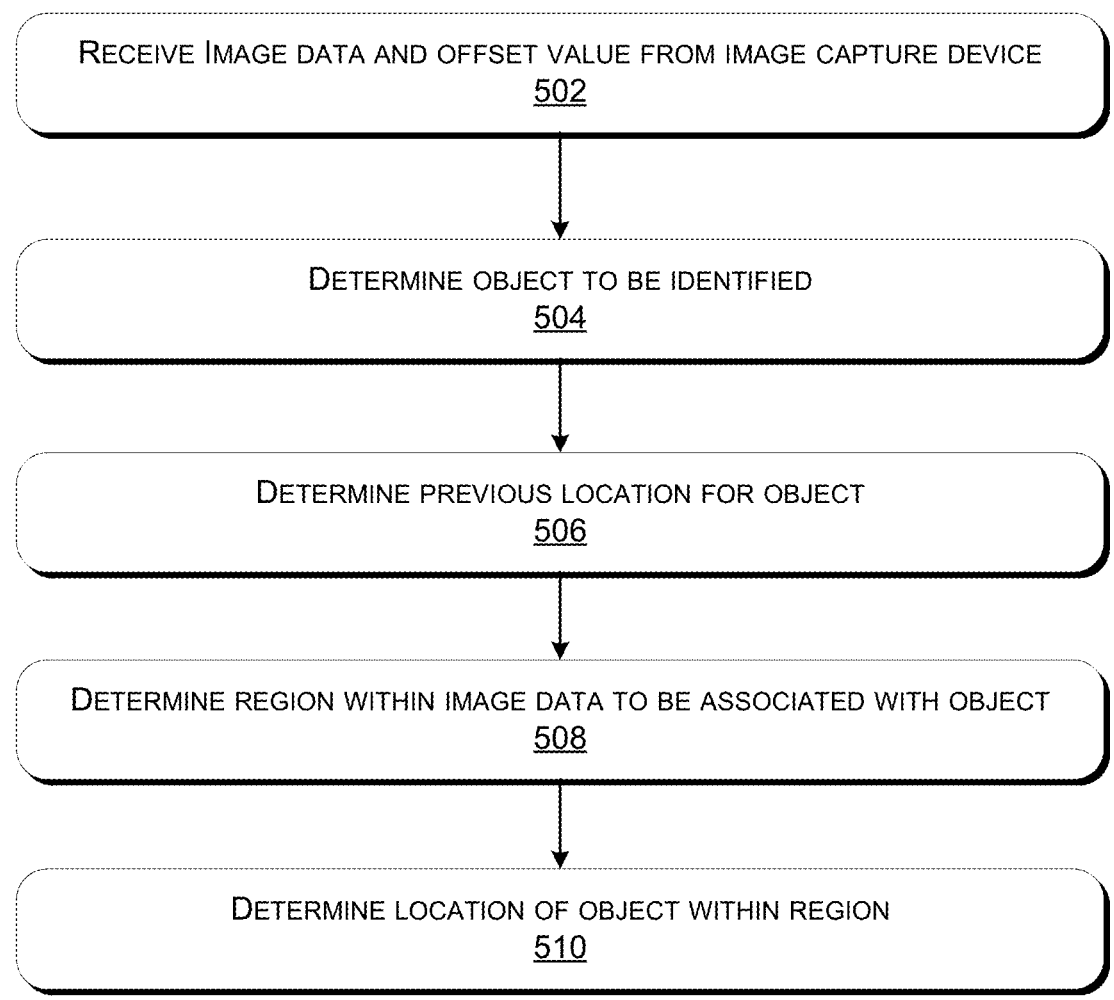
FIG. 5 depicts a block diagram showing an example flow for a process of determining an object region within an image to facilitate object tracking in accordance with embodiments.

FIG. 5 depicts a block diagram showing an example flow for a process of determining an object region within an image to facilitate object tracking in accordance with embodiments. The process 500 may be performed by components within an image capture device 102 as discussed with respect to FIG. 1 above.

At 502, the process 500 comprises receiving image data and an indication of an offset value from an image capture device. The image data and the indication of the offset value may be received via a wireless or wired communication channel. In some embodiments, the image data comprises a series of frames in a video file. In such embodiments, the current image data may comprise a frame within a video. The image data may be received in real-time as streaming video.

An offset value is determined based on sensor data received from one or more positional sensors installed in the image capture device. the positional sensors comprise at least one of an accelerometer, a gyroscope, or a magnetometer. The offset value represents a degree of movement of the image capture device. In some embodiments, such a degree of movement is detected within a period of time between the collection of the previous image data and the collection of the current image data. In some cases, the offset value may comprise an indication of a direction and a number of pixels within the image. The offset value may include each of a horizontal and vertical component.

An offset value may be determined by the image capture device or by the object tracking platform. For example, an image capture device may be configured to calculate such an offset value based on sensor data obtained via positional sensors installed within the image capture device. In another example, the image capture device may pass the sensor data obtained via the positional sensors to the object tracking platform, and the object tracking platform may calculate the offset value from that data. In some cases, the offset value is determined based on a degree of angular rotation of the image capture device. In some cases, the offset value is determined based on an amount of movement or acceleration in one or more directions.

At 504, the process 500 comprises determining an object to be identified and/or tracked. In some embodiments, a list of objects associated with the video (e.g., previously detected objects) may be maintained. In these embodiments, object tracking may be performed for each of the objects in the list of objects.

At 506, the process 500 comprises determining a previous location for the object as determined with respect to previous image data. For example, a previous location may comprise a location at which the object was detected within the previous image data. In some embodiments, such a previous location may comprise coordinates within the previous image data as determined by subjecting the previous image to one or more object detection techniques. Using such object detection techniques, coordinates of the object may be determined within the previous image.

At 508, the process 500 comprises determining a region within the image data to be associated with the object. A region may be a portion of the image. For example, in some cases a region may comprise a rectangular array of pixels. Such an array may include any number of rows and columns centered around a particular location. In another example, a region may comprise a circular area of pixels having a radius less than or equal to a threshold value. In some embodiments, a location of the region may be determined within the image data based on a location of the object in a previous image as well as based on the offset value. In some embodiments, the location of the region within the image data is also determined based on a velocity of the at least one object.

At 510, the process 500 comprises determining a location of the object within the region. In some embodiments, this may comprise performing one or more object recognition techniques on the determined region.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
receiving, from an image capture device, current image data and an offset value at an object tracking platform via a wired or wireless connection, the offset value indicating a change in at least one of a position or an orientation of the image capture device between a collection of the current image data at a first point in time and a collection of previous image data at a second point in time;
determining, at the object tracking platform, at least one object to be identified within the current image data;
determining, at the object tracking platform, a previous location of the at least one object within the previous image data;
determining, at the object tracking platform, based on the previous location of the at least one object within the previous image data and the offset value, a region within the current image data to be attributed to the at least one object, the determining of the region enables performance of machine learning-based object recognition for detecting the at least one object to be reduced from being performed on the current image data to being performed on the region that is less the current image data; and
determining, at the object tracking platform, a location of the at least one object within the region using at least one machine learning-based object recognition technique.

2. The method of claim 1, wherein the offset value is determined based on sensor data received from one or more positional sensors installed in the image capture device.

3. The method of claim 2, wherein the one or more positional sensors comprise at least one of an accelerometer, a gyroscope, or a magnetometer.

4. The method of claim 1, wherein the region within the current image data is also determined based on a velocity of the at least one object.

5. The method of claim 1, wherein the offset value includes a degree of movement of the image capture device.

6. The method of claim 5, wherein the degree of movement is detected within a period of time between the collection of the previous image data and the collection of the current image data.

7. The method of claim 1, wherein the current image data comprises a series of frames in a video file.

8. The method of claim 7, wherein the current image data is received in real-time as streaming video.

9. A computing device comprising:
a processor; and
a memory including instructions that, when executed with the processor, cause the computing device to, at least:
receive, from an image capture device, current image data and an offset value that indicates a change in at least one of a position or an orientation of the image capture device between a collection of the current image data at a first point in time and a collection of previous image data and a second point in time;
determine at least one object to be identified within the current image data;
determine a previous location of the at least one object within previous image data;
determine, based on the previous location of the at least one object with the previous image data and the offset value, a region within the current image data to be attributed to the at least one object, the region comprising less than the current image data; and
determine a location of the at least one object within the region using at least one machine learning-based object recognition technique.

10. The computing device of claim 9, wherein the current image data comprises a frame within a video.

11. The computing device of claim 9, wherein the offset value comprises an indication of a direction and a number of pixels.

12. The computing device of claim 9, wherein the offset value comprises each of a horizontal and vertical component.

13. The computing device of claim 9, wherein the offset value comprises a data value determined based on a degree of angular rotation of the image capture device.

14. The computing device of claim 9, wherein the offset value is determined based on an amount of movement or acceleration of the image capture device in one or more directions.

15. The computing device of claim 14, wherein the region within the current image data comprises an array of pixels of a determined size.

16. The computing device of claim 15, wherein the determined size of the region within the current image data is determined based on a size of the at least one object.

17. The computing device of claim 16, wherein the size of the region within the current image data is also determined based on a velocity of the at least one object.

18. A non-transitory computer-readable media collectively storing computer-executable instructions that upon execution cause one or more computing devices to collectively perform acts comprising:

receiving, from an image capture device, current image data and an offset value that indicates a change in at least one of a position or an orientation of the image capture device between a collection of the current image data at a first point in time and a collection of previous image data and a second point in time;

determining at least one object to be identified within the current image data;

determining a previous location of the at least one object within previous image data;

determining, based on the previous location of the at least one object within the previous image data and the offset value, a region within the current image data to be attributed to the at least one object, the determining of the region enables performance of machine learning-based object recognition for detecting the at least one object to be reduced from being performed on the current image data to being performed on the region that is less the current image data; and determining a location of the at least one object within the region using at least one machine learning-based object recognition technique.

19. The non-transitory computer-readable media of claim 18, wherein the offset value is determined based on sensor data received from one or more positional sensors installed in the image capture device.

20. The non-transitory computer-readable media of claim 19, wherein the one or more positional sensors comprise at least one of an accelerometer, a gyroscope, or a magnetometer.

* * * * *